(12) United States Patent
Foster et al.

(10) Patent No.: US 7,028,832 B2
(45) Date of Patent: Apr. 18, 2006

(54) DRIVE UNIT MOUNT FOR RECIPROCATING SLAT CONVEYOR

(75) Inventors: Raymond Keith Foster, Madras, OR (US); Randall Mark Foster, Salem, OR (US); William J. Onricek, Redmond, OR (US)

(73) Assignee: Keith Investments, LLC, Madras, OR (US)

( * ) Notice: Subject to any disclaimer, the term of this patent is extended or adjusted under 35 U.S.C. 154(b) by 57 days.

(21) Appl. No.: 10/943,447

(22) Filed: Sep. 17, 2004

(65) Prior Publication Data

US 2006/0060452 A1    Mar. 23, 2006

(51) Int. Cl.
B65G 25/04 (2006.01)
(52) U.S. Cl. .................... 198/750.5; 198/750.2
(58) Field of Classification Search ............ 198/750.2, 198/750.5, 750.6, 750.7
See application file for complete search history.

(56) References Cited

U.S. PATENT DOCUMENTS

| 5,263,573 | A | * | 11/1993 | Hallstrom, Jr. | .......... | 198/750.6 |
| 5,332,081 | A | * | 7/1994 | Quaeck | .................... | 198/750.6 |
| 5,799,778 | A | * | 9/1998 | Quaeck | .................... | 198/750.5 |
| 5,957,267 | A | * | 9/1999 | Quaeck et al. | ........... | 198/750.5 |
| 6,026,949 | A | * | 2/2000 | Foster | .................... | 198/750.5 |

* cited by examiner

Primary Examiner—James R. Bidwell
(74) Attorney, Agent, or Firm—Delbert J. Barnard

(57) ABSTRACT

Transverse frame members (14, 16) extend across and are connected to longitudinal frame members (10, 12). Frame member (14) divides longitudinal frame members (10, 12) into major and minor parts (20, 22, 24, 26). The minor parts (24, 26) are braced by gussets (70, 72) which extend between the minor parts (24, 26) and a vertical web portion (68) of the transverse beam (14). The minor parts (24, 26) of the frame members (10, 12) and the central portion of the frame member (14) form a nook (76) in the cylinder components (80, 82, 84, 102, 104) are received. Piston rod portions (92, 94, 96) of the assembly of linear motors extend from the cylinder component portions to guide bearings (100) mounted in openings (56, 58, 60) formed in the vertical web (54) of the second transverse beam (16). Bolts are used to connect the inner corner portions of the assembly of linear hydraulic motors to mounting pads (34, 36). More bolts are used to connect the outer corner portion of the cylinder components to mounting lugs (38, 40).

24 Claims, 12 Drawing Sheets

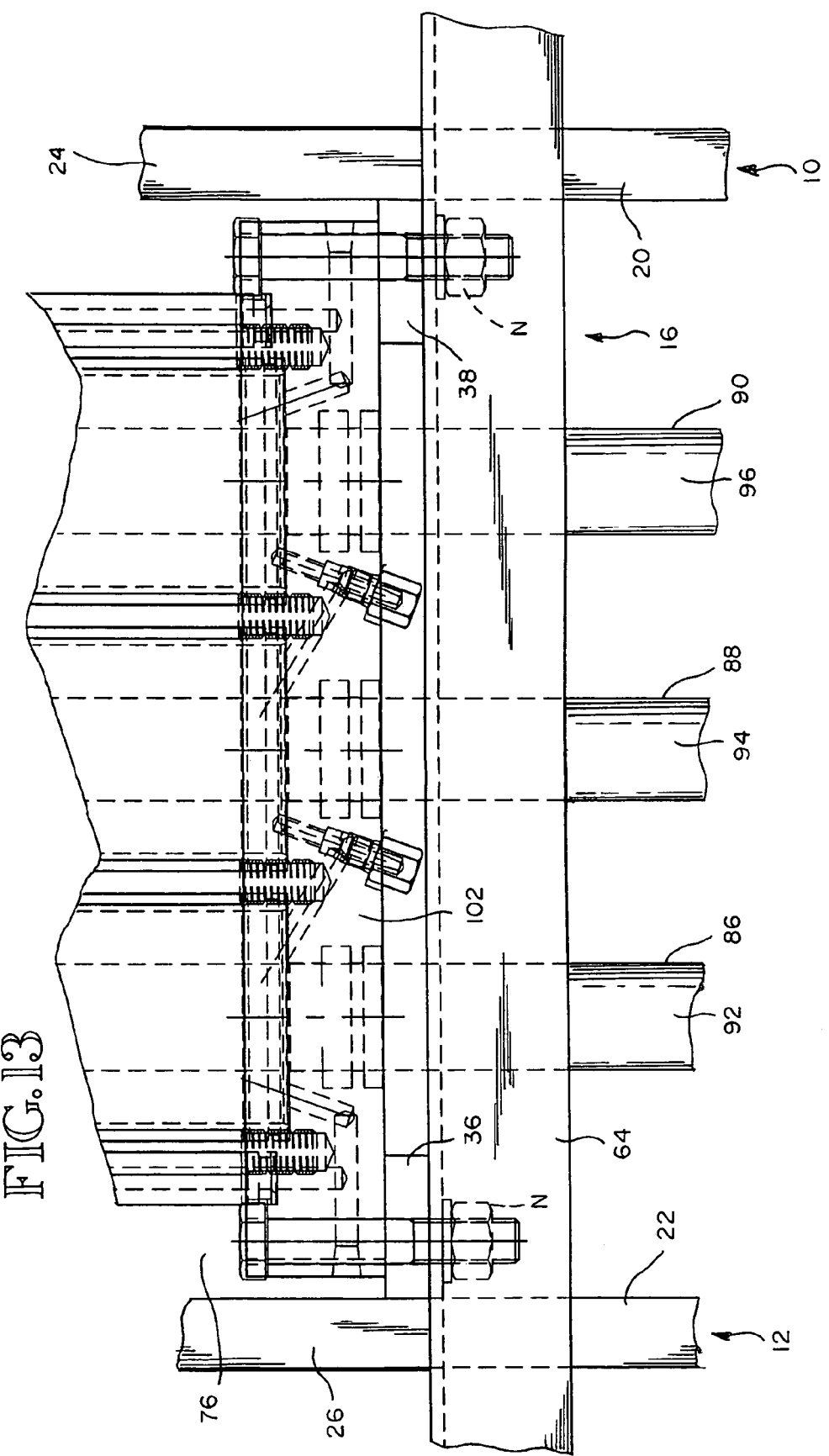

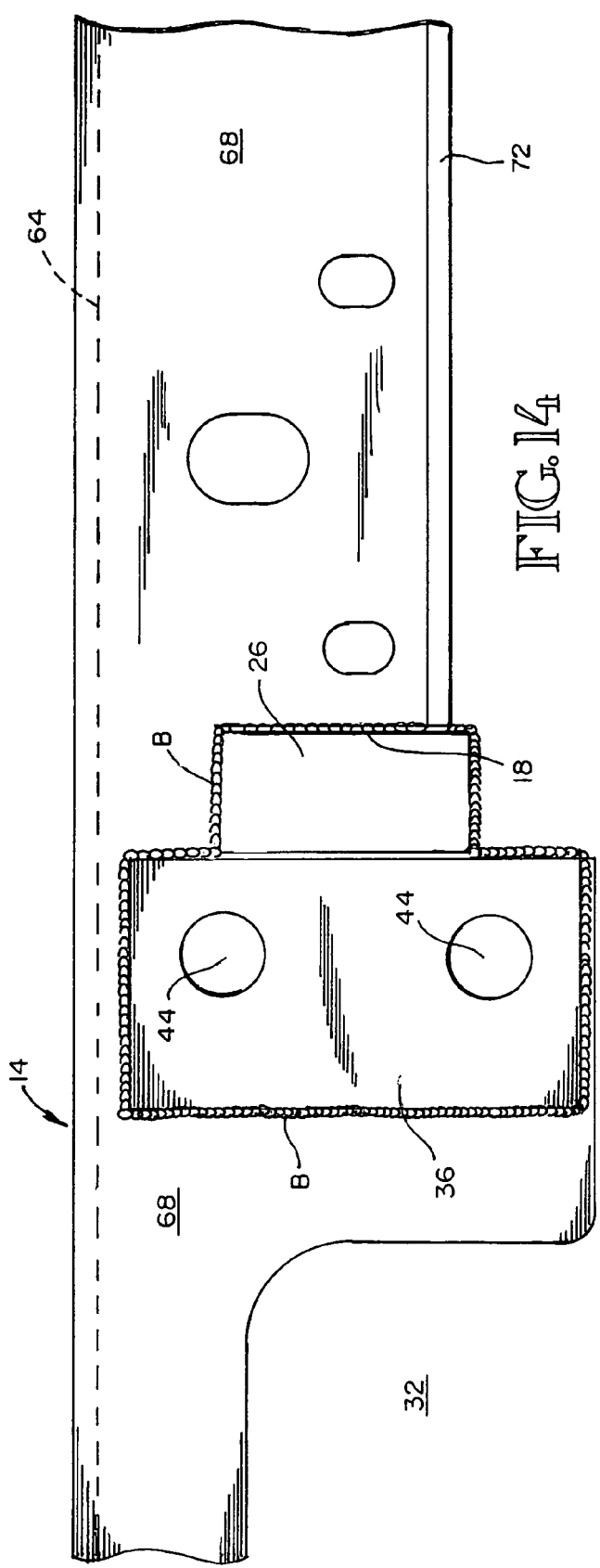
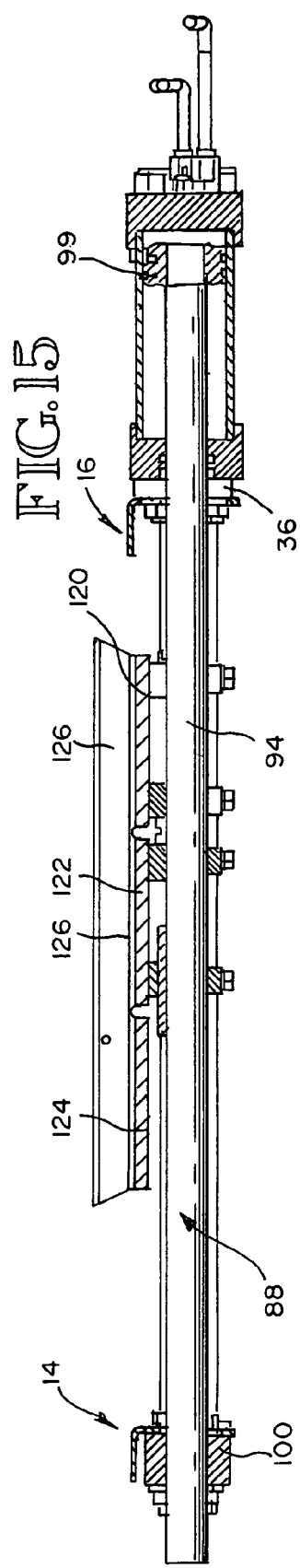

DRIVE UNIT MOUNT FOR RECIPROCATING SLAT CONVEYOR

TECHNICAL FIELD

This invention relates to reciprocating slat conveyors. More particularly, it relates to the provision of a lightweight mounting frame for the hydraulic drive components of a reciprocating slat conveyor, and to the drive unit formed by the frame and hydraulic drive components.

BACKGROUND OF THE INVENTION

Reciprocating slat conveyors in the patent literature are disclosed by my U.S. Pat. No. 4,474,285, granted Oct. 2, 1984, by my U.S. Pat. No. 4,793,469, granted Dec. 27, 1988, and by my U.S. Pat. No. 5,984,076, granted Nov. 16, 1999. A common denominator of the conveyors disclosed by these patents is that portions of their hydraulic cylinders are positioned in a vertical space defined top and bottom by the transverse floor frame beams.

My U.S. Pat. No. 4,793,469 presents a good description of how a three slat reciprocating slat conveyor system is build and works. The contents of this patent are hereby incorporated by reference into this document.

The following additional patents should also be considered by the purpose of putting the present invention into proper perspective relative to the prior art: U.S. Pat. No. 5,263,573, granted Nov. 23, 1993 to Olaf A. Hallstrom, Jr.; U.S. Pat. No. 5,957,267, granted Sep. 28, 1999 to Manfred W. Quaeck and Eric A. Marttila; and European Patent 0 721 901, filed Jan. 15, 1996, by Cargo Handling Systems B. V.

There is a need for a mounting frame for the hydraulic drive components which is strong and at the same time is relatively small and is made of lightweight materials. The primary object of the present invention is to fill this need, particularly in connection with reciprocating slat conveyors having three sets of conveyor slats.

BRIEF SUMMARY OF THE INVENTION

The mounting frame of the present invention is for an assembly of linear hydraulic motors, each of which has a cylinder component and a piston component. The cylinder component has a closed first end and an opposite second end. The piston component includes a piston rod that projects out from the second end of the cylinder component. The mounting frame is basically characterized by a pair of longitudinal frame members laterally outwardly bounding the assembly of linear hydraulic motors. A transverse frame member extends perpendicular to the longitudinal frame members and divides them into major and minor parts. The transverse frame member is connected to the longitudinal frame members. The minor parts of the longitudinal frame members extend in one direction from the transverse frame member and the major parts extend in the opposite direction from the transverse frame member. The transverse frame member has a vertical portion that includes a downwardly opening recessed in its extent between the longitudinal frame members. The vertical portion of the transverse frame member includes mounting pads for the ends of the cylinder components that are located at the ends of the recess. The pads are located where the minor parts of the longitudinal frame members meet the transverse frame member. The minor parts of the longitudinal frame members have outer ends and mounting lugs at their outer ends. The mounting frame is adapted to receive the cylinder components of the assembly of linear hydraulic motors laterally between the minor parts of the longitudinal frame members and longitudinally between the mounting pads on the transverse frame member and the mounting lugs at the outer ends of the minor parts of the longitudinal frame members. The mounting lugs are adapted to be connected to the first ends of the cylinder components. The mounting pads are adapted to be connected to the second ends of the cylinder components.

In preferred form, horizontal gussets extend laterally outwardly from the minor parts of the longitudinal frame members, between the minor parts of the longitudinal frame members and the vertical portion of the transverse frame member. Preferably, the vertical portion of the transverse frame member and the gussets are formed from a single sheet metal member. Preferably also, the gussets are connected to lower edge portions of the minor parts of the longitudinal frame members.

The mounting pads and the mounting lugs may include bolt receiving openings, for receiving bolts that connect them to the ends of the cylinder component portion of the assembly of linear hydraulic motors.

The major parts of the longitudinal frame members may have ends distal the transverse frame member. A second transverse frame member may extend perpendicular to the longitudinal frame members and be connected to the distal ends of the major parts of the longitudinal frame members. The second transverse frame member is adapted to receive and guide end portions of the piston rods.

In preferred form, the transverse frame member has an upper portion connected to the vertical portion and extending horizontally from the vertical portion towards the side of the vertical portion on which the major parts of the longitudinal frame members are situated. It also has a lower portion connected to the vertical portion that extends from the vertical portion in the direction in which the minor parts of the longitudinal frame members are situated. The lower part of the transverse frame member includes gusset forming portions that extend between the vertical portion of the transverse frame member and the minor parts of the longitudinal frame member, laterally outwardly of the minor parts of the longitudinal frame members. In its extent outwardly of the gussets, the lower portion of the transverse frame member is relatively narrow.

The cylinder components of the assembly of linear hydraulic motors may comprise two laterally extending manifold blocks, and cylindrical barrel portions interconnected between the manifold blocks. Corner portions of the manifold blocks are connected to the mounting pads and the mounting lugs.

Other objects, advantages and features of the invention will become apparent from the description of the illustrated embodiment set forth below, from the drawings, from the claims and from the principles that are embodied in the specific structures that are illustrated and described.

BRIEF DESCRIPTION OF THE SEVERAL VIEWS OF THE DRAWINGS

Like reference numerals are used to designate like parts throughout the several views of the drawings, and:

FIG. 13 is a fragmentary view showing a manner of connecting the inner or rod end of the assembly of cylinders to the vertical portion of the adjacent transverse mounting member;

FIG. 14 is a fragmentary sectional view taken substantially along line 14—14 of FIG. 5; and FIG. 15 is a longitudinal sectional view taken substantially along line 15—15 of FIG. 7.

DETAILED DESCRIPTION OF THE ILLUSTRATED EMBODIMENTS

Figure 1:
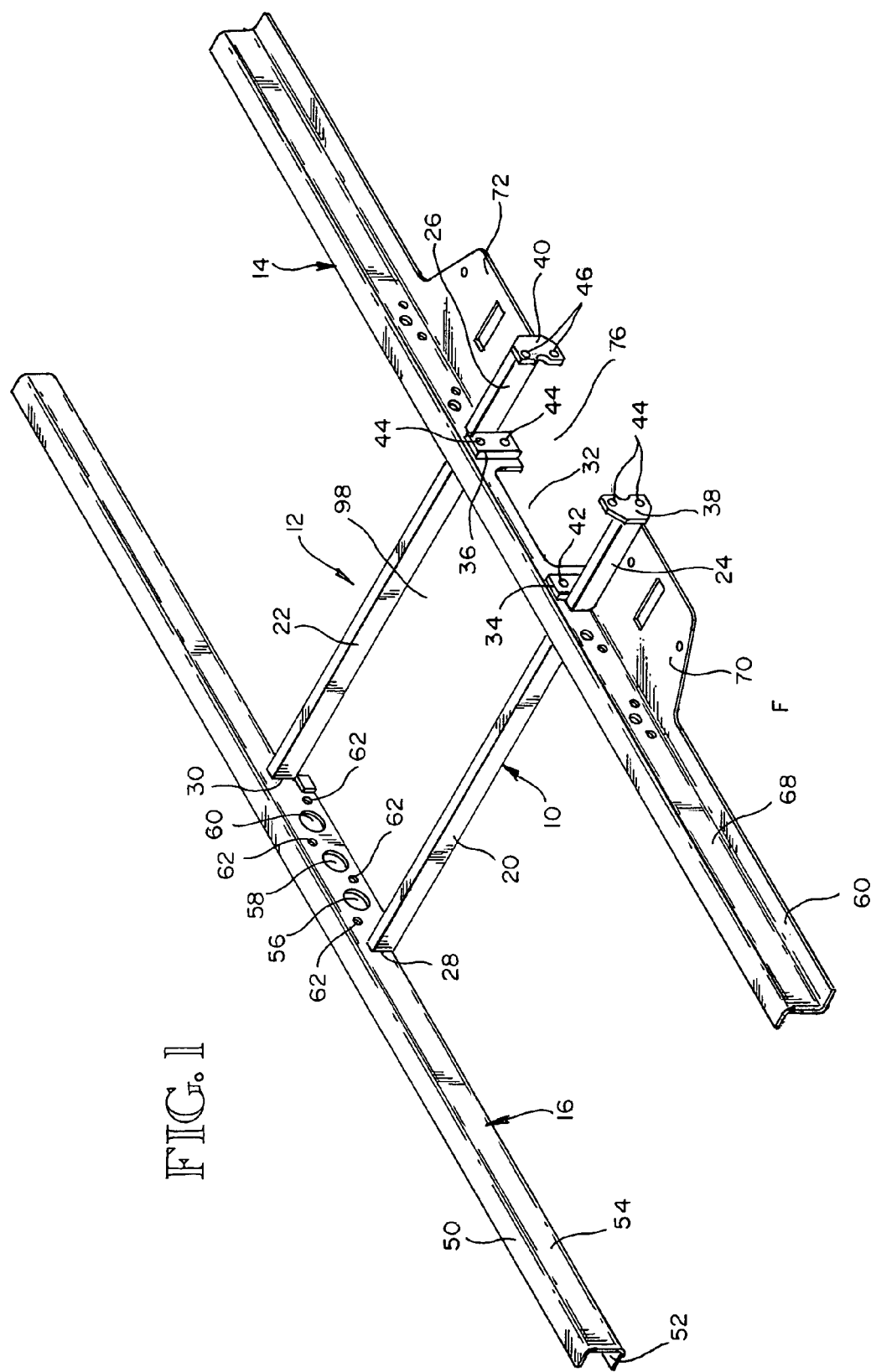
FIG. 1 is a pictorial view of a mounting frame constituting the preferred embodiment of the invention, such view being taken from above and looking towards the top, a first side and a first end of the mounting frame.
Figure 2:
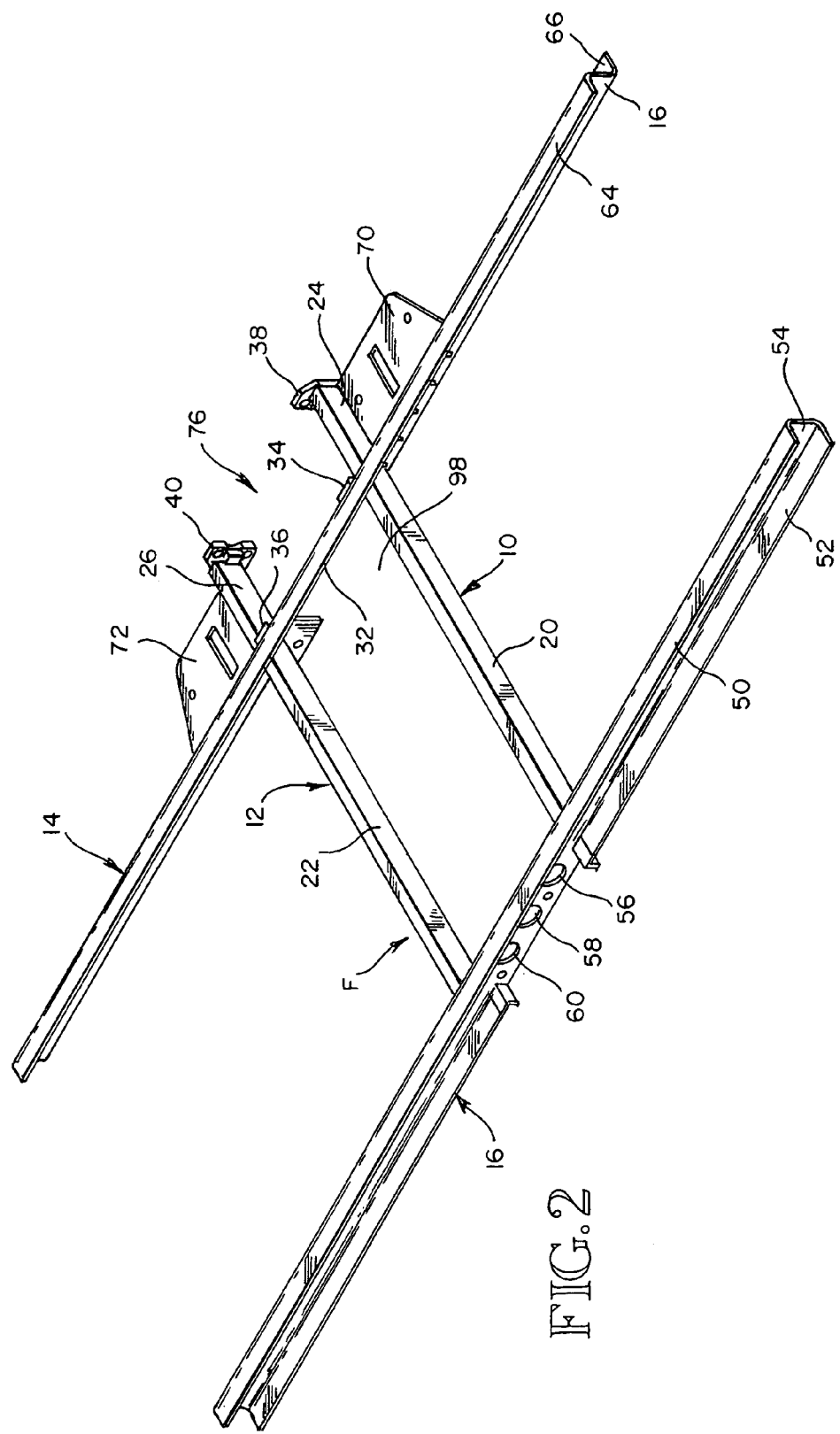
FIG. 2 is a pictorial view of the mounting frame of FIG. 1, such view being taken from above and looking towards the top, the second side and the second end of the mounting frame shown by FIG. 1.
Figure 3:
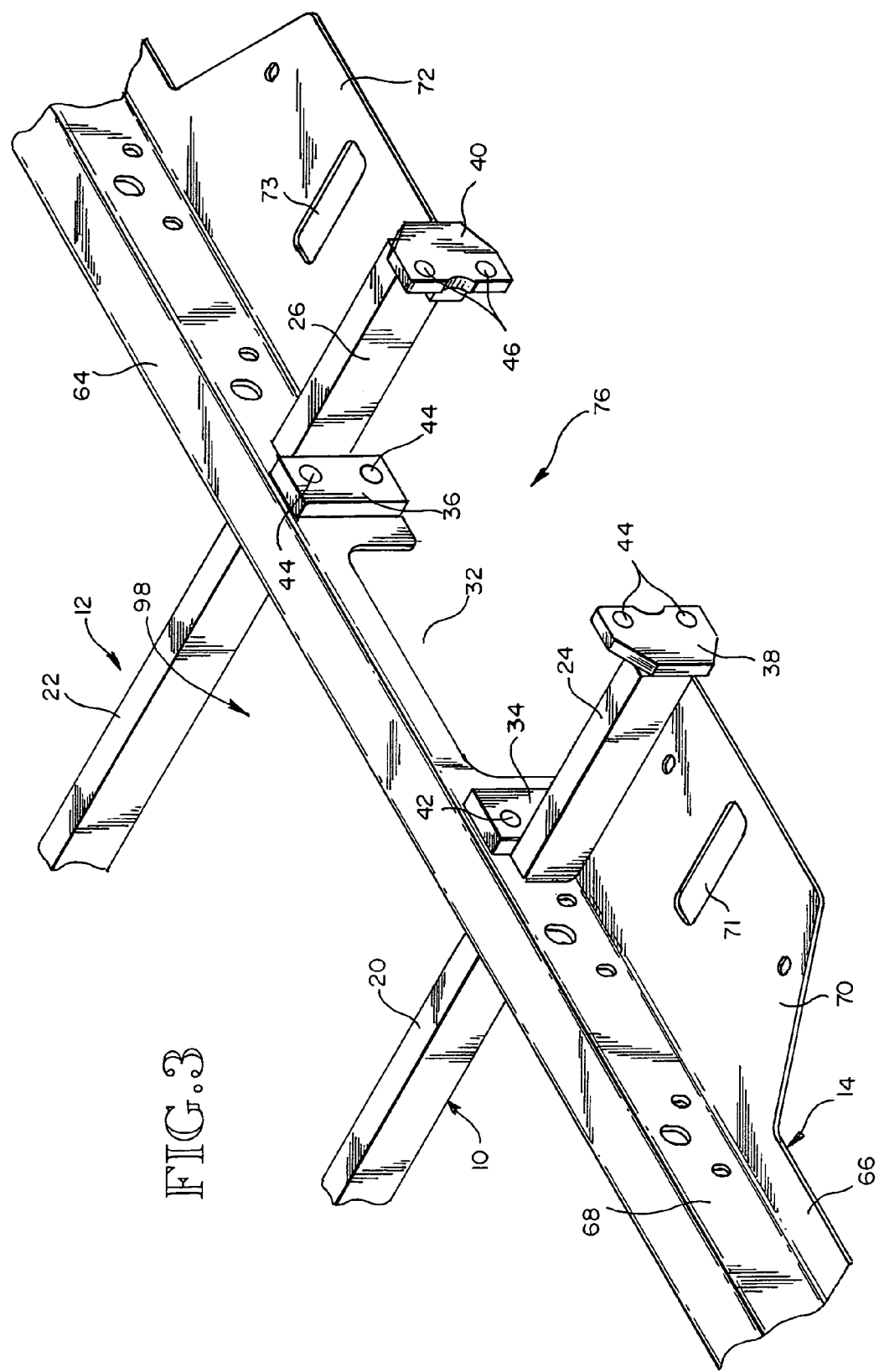
FIG. 3 is an enlarged scale fragmentary view of the end portion of the end portion of the mounting frame shown in the foreground portion of FIG. 1.

As best shown by FIGS. 1–3, the preferred embodiment of the mounting frame of the present invention comprises a pair of longitudinal frame members 10, 12 and a pair of transverse frame members 14, 16. Transverse frame member 14 extends across and is connected to intermediate portions of the longitudinal frame members 10, 12. Frame member 14 has a vertical portion or web 68 that is notched in the vicinity of the longitudinal frame members 10, 12. As best shown by FIG. 14, the longitudinal frame members 10, 12 fit within the notch 18. Weld beads B extend vertically along the sides of the beams 10, 12 and at the tops of the beams 10, 12, for connecting the beams 10, 12 to the vertical portion 68 of the frame member 14.

Referring back to FIGS. 1–3, the longitudinal frame members 10, 12 have major portions 20, 22 and minor portions 24, 26. The ends of the major portions 20, 22 distal the mounting frame member 14 are connected to the transverse frame member 16. They are welded at the distal ends to the vertical portion of frame member 16, at locations 28, 30 (FIG. 1). The frame member 16 may be of channel form in cross section. The vertical or web portion of the beam 16 may be notched to receive the distal ends 28, 30 of the major portions 20, 22 of the beams 10, 12.

The vertical portion 68 of beam 14 preferably has a downwardly opening recess 18 in its extent between the minor parts 24, 26 of the longitudinal beams 10, 12. At the ends of the vertical portion 68 of beam 14, in its extent between the minor parts 24, 26 of the longitudinal beams 10, 12, the vertical wall 68 includes mounting pads 34, 36. These mounting pads 34, 36 may merely be areas on the vertical portion 68 to which corner portions of the cylinder components of the assembly of linear hydraulic motors can be connected. The outer ends of the minor parts 24, 26 of the longitudinal beams 10, 12 are preferably provided with mounting lugs 38, 40 for connection to outer corner portions of the assembly of linear hydraulic motors. The mounting pads 34, 36 may include bolt receiving holes 42, 44 and the mounting lugs 38, 40 may include bolt receiving holes 46, 48.

Figure 4:
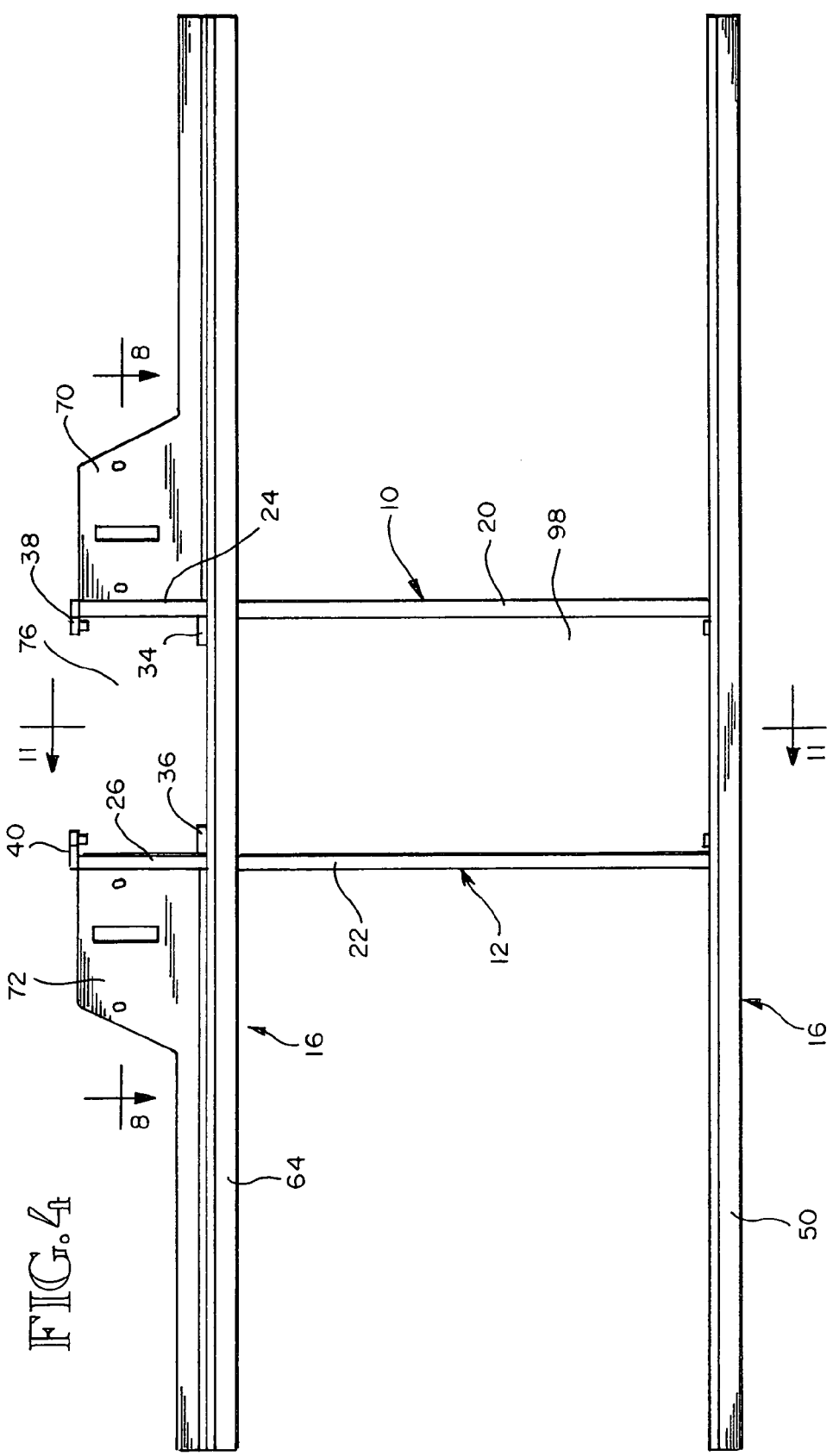
FIG. 4 is a top plan view of the mounting frame shown by FIGS. 1 and 2.
Figure 5:
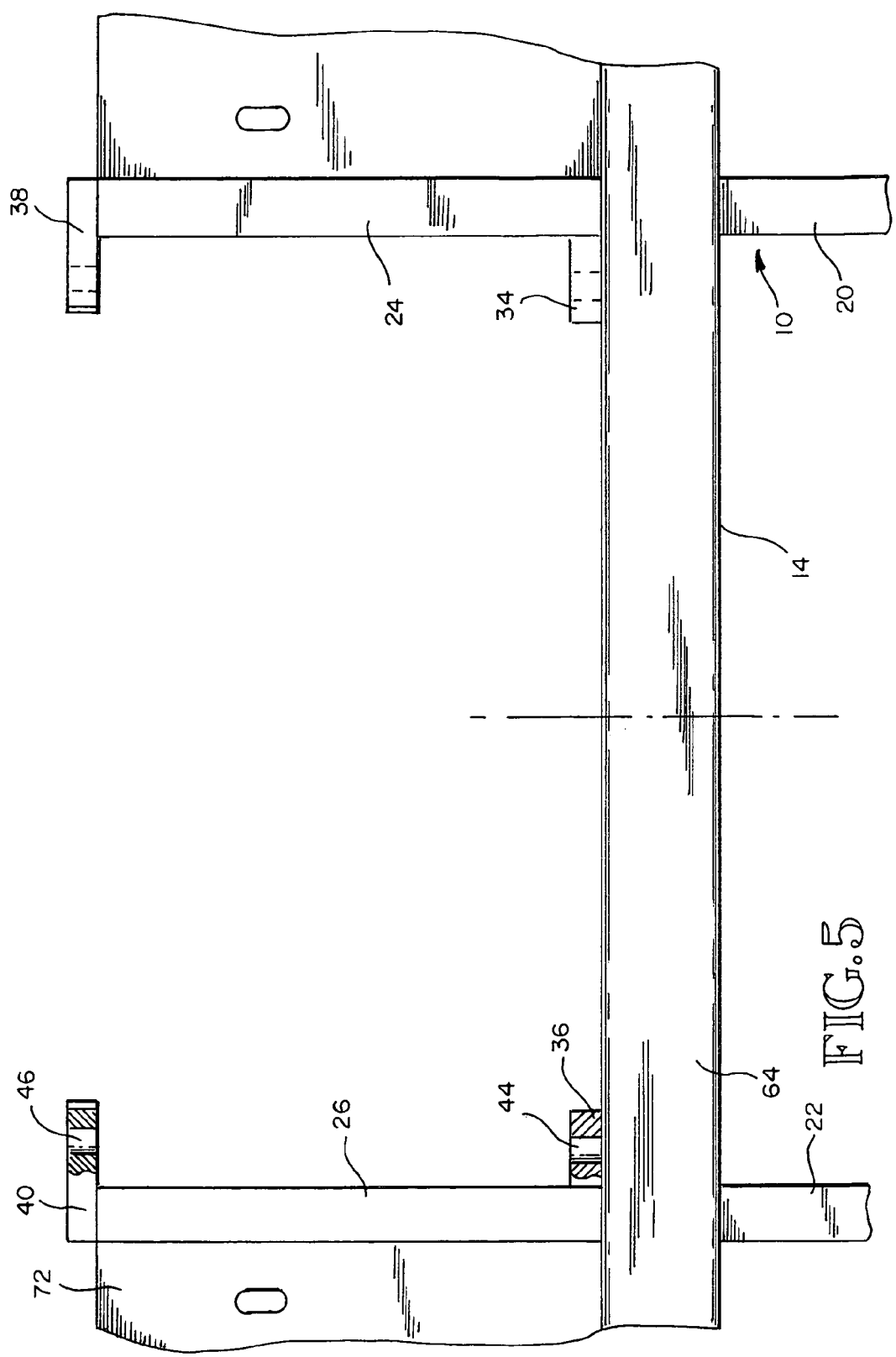
FIG. 5 is an enlarged scale fragmentary view of the end of the mounting frame that receives the cylinder components of the assembly of linear hydraulic motors.

As previously stated, the transverse frame member 16 may have a channel or U-shaped cross section or, it may be an I-beam. Such beam 16 is shown to comprise a top flange 50, a bottom flange 52 and a web 54 that extends vertically between the flanges 50, 52. In the region between the major parts 20, 22 of the longitudinal beams 10, 12, the web may be provided with openings 56, 58, 60. Bearing blocks 100 (FIG. 15) for the piston rods are preferably connected to the vertical wall portion 16. Bolt holes 62 are formed in the web 54 to receive bolts that connect bearing blocks to the web 54. These bearing blocks may be like the bearing blocks shown in FIG. 4 of the aforementioned U.S. Pat. No. 5,984,076.

Preferably, transverse frame member 14 is roll formed or stamped from a single sheet metal member. The member is shaped to include an upper flange 64, a lower flange 66, and a web 68. The upper flange 64 is shown extending towards the mounting frame 16. The lower flange 66 is shown extending in the opposite direction. As flange 66 extends inwardly along the member 14, it widens in regions 70, 72 to form gussets (hereinafter 70, 72) that extend between mounting frame member 14 and the minor parts 24, 26 of the longitudinal frame members 10, 12. As illustrated, the ends of the gussets 70, 72 that border the minor parts 24, 26 of the longitudinal frame members 10, 12 have a length substantially matching the length of the minor parts 24, 26. The gussets 70, 72 extend laterally outwardly from the minor parts 24, 26 of the longitudinal frame members 10, 12 a substantial distance, so that they provide substantial bracing of the minor parts 24, 26 of the longitudinal frame members 10, 12 from the vertical web 68 of the transverse frame member 14. Preferably, the gussets are shorter in length longitudinally of the frame member 14 than the outer end portions of the beam 14. In the outer end portions, the lower flange 66 has a width substantially equal to the width of the upper flange 64.

Figure 7:
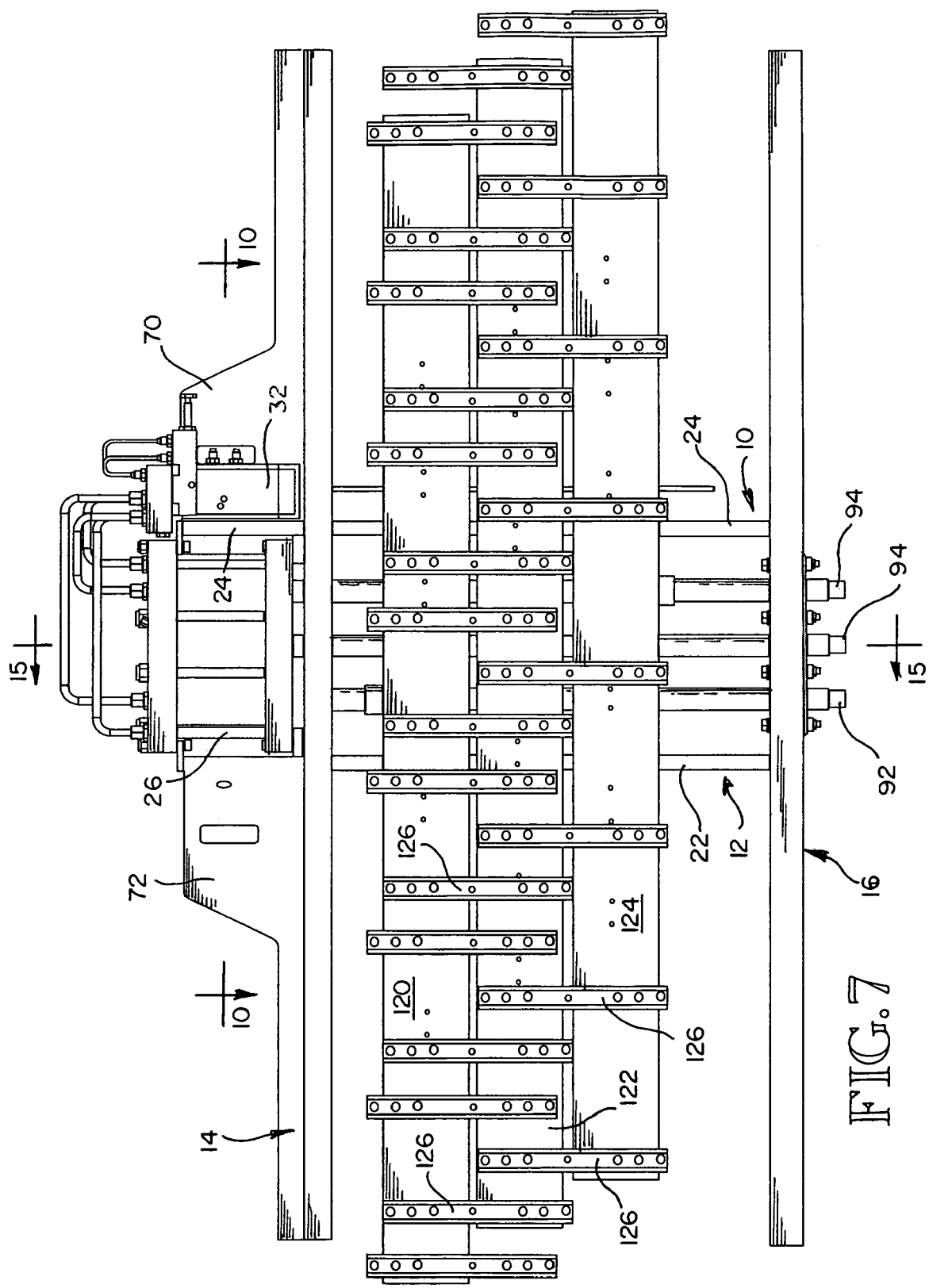
FIG. 7 is a top plan view like FIG. 4, but including the assembly of linear hydraulic motors connected to the mounting frame.
Figure 8:
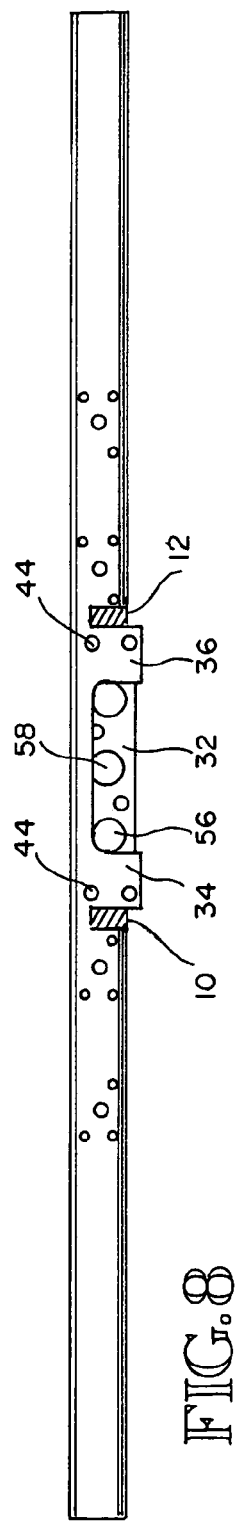
FIG. 8 is a transverse sectional view taken substantially along line 8–8 of FIG. 4.
Figure 9:
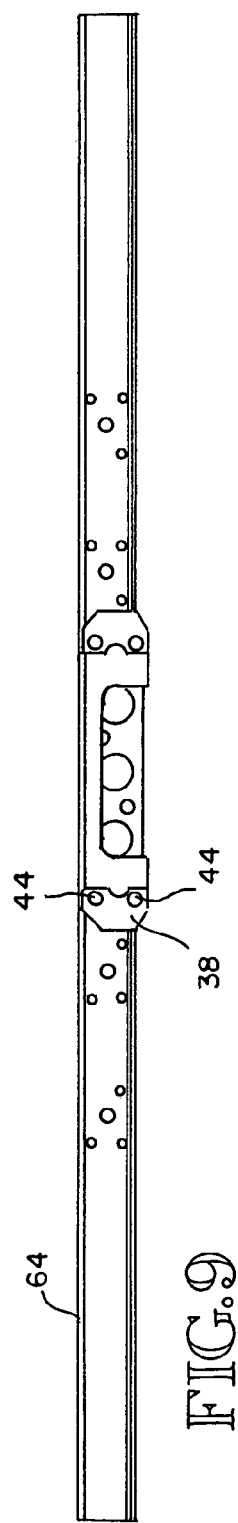
FIG. 9 is an end elevational view looking toward the upper end of the mounting frame as shown in FIG. 4.
Figure 10:
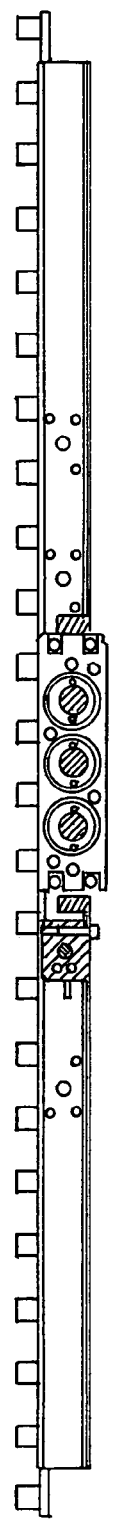
FIG. 10 is a sectional view taken substantially along line 10—10 of FIG. 7.
Figure 11:
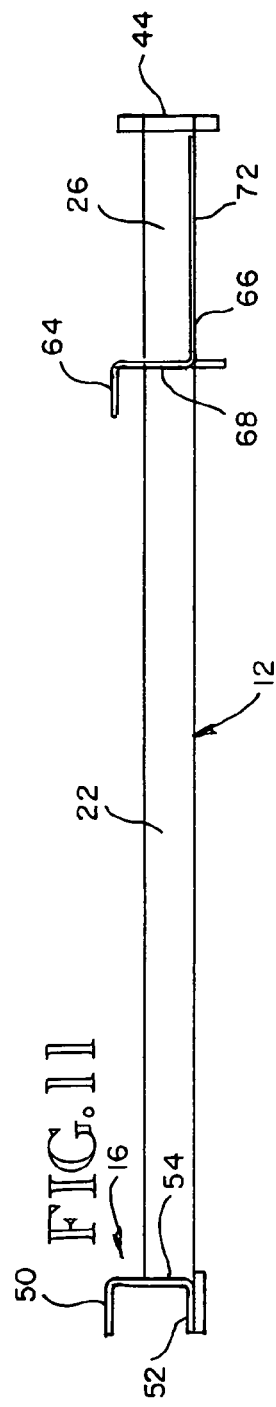
FIG. 11 is a longitudinal sectional view taken substantially along line 11—11 of FIG. 4.

The central portion of the transverse frame member 14, and the minor parts 24, 26 of the longitudinal frame members 10, 12 form a space, well or nook 76 in which the cylinder components of the assembly of linear hydraulic motors are situated. The nook 76 when empty is best shown in FIGS. 1–4. The nook 76 with the cylinder components in it is best shown in FIGS. 7 and 12.

Figure 12:
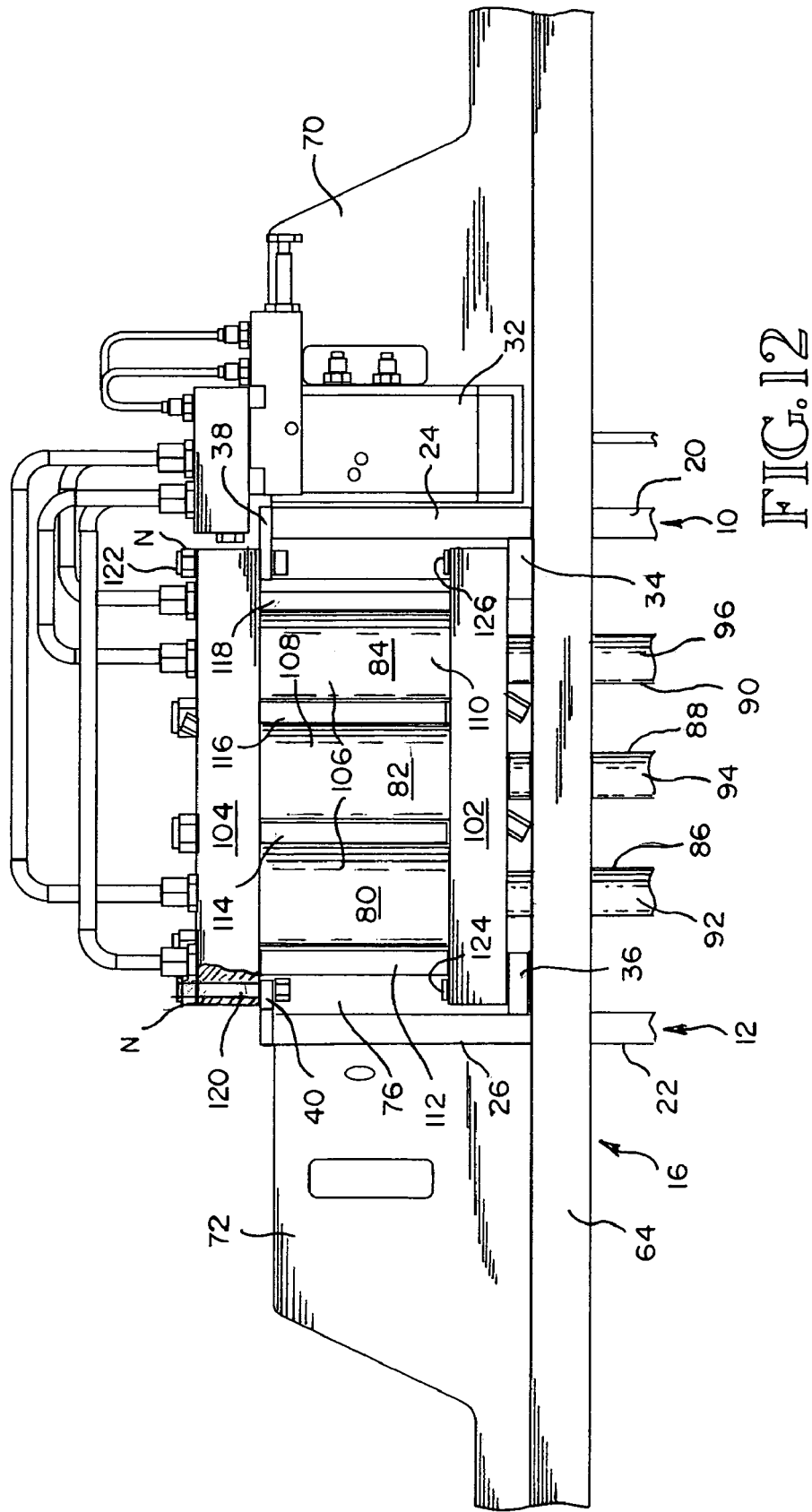
FIG. 12 is an enlarged scale fragmentary view of the upper end portion of the assembly shown in FIG. 7.

Referring to FIG. 12, the assembly of linear hydraulic motors comprises cylinder components 80, 82, 84 and piston components 86, 88, 90. The piston components 86, 88, 90 include piston heads that are inside of the cylinder components 80, 82, 84 and piston rods 92, 94, 96 that connect at their inner ends to the piston heads and then extend from the piston heads out through the inner ends of the cylinder components 80, 82, 84, and then extend through the open region 98 in the mounting frame that is bounded on its sides by members 20, 22 and at its ends by members 14, 16. As shown by FIG. 7, the outer end portions of the piston rods 92, 94, 96 extend through the bearing blocks 100 (FIG. 15) that are mounted on the central region of frame member 16. FIG. 15 shows the piston head 99 for the center drive unit and shows its piston rod 94 and its guide bearing 100. The other two linear motors have the same construction so they have not been separately illustrated.

The cylinder portions 80, 82, 84 include inner and outer manifolds 102, 104 and tubular bodies 106, 108, 110 that extend between the manifolds 102, 104 in the manner shown by FIG. 15. Elongated tie bolts 112, 114, 116, 118 connect the manifolds 102, 104 together and clamp the tubular members 106, 108, 110 between the manifolds 102, 104. This construction of the cylinder components is per se old and, by way of example, is disclosed in the aforementioned U.S. Pat. No. 5, 263,573. The manifolds 102, 104 are three-dimensional rectangles. That is, they each have a length, width and a thickness. Their tops, bottoms, ends and sides are all rectangles. As a result, the assembly of the cylinder components 80, 82, 84 has rectangular proportions and it is received within the nook 76 that also has rectangular proportions. Corner bolts 120, 122, 124, 126 (FIG. 12) secure the corners of the manifolds 102, 104 to the mounting blocks 34, 36 and the mounting lugs 38, 40. As shown in FIG. 12, the corner bolts 120, 122 extend through openings in the manifold 104 and through the openings 44, 48 in the mounting lugs 38, 40 and connect to nuts that are outwardly of the manifold 104. The connector bolts 124, 126 extend through openings in the manifold 102 and through the openings 42, 44 in the mounting pads 34, 36 and then receive nuts in at their threaded ends, as shown in FIG. 13.

The cylinder pack 80, 82, 84, 102, 104 can be easily and quickly connected to and disconnected from the mounting frame F. The extension of the longitudinal frame members 10, 12 outwardly of the transverse frame member 16, and the connection of the outer ends of the cylinder packs 80, 82, 84, 102, 104 to the outer ends of the extended portions 22, 26 of the longitudinal frame members 10, 12 adds considerable extra strength and rigidity to the assembly of linear hydraulic motors. When compared to the prior art devices that connect the cylinder packs only to the transverse frame member. The provision of the gussets 70, 72 adds additional strength and rigidity to the entire assembly. When the assembly is in place, the tie bolts 112, 114, 116, 118 play a different role in the assembly than they do in the prior art devices.

Owing to the construction of the frame F, and the cooperation of the frame F and the assembly of linear hydraulic motors, it is possible to make the frame members 10, 12, 14, 16 from lightweight materials, e.g., aluminum alloys. It also makes it possible to minimize the construction and assembly steps involved in the making of the frame F. The members 14, 16 are formed from sheet metal members. The gussets 70, 72 are integral parts of the member 14, although there is still cutting and welding, the amount has been lessened substantially, contributing to an easy and economical manufacture of the frame F and the drive unit formed by the frame F and the assembly of linear hydraulic motors.

As shown by FIG. 7, a plurality of transverse frame beams 120, 122, 124, one for each linear hydraulic drive unit, extends across the piston rods 92, 94, 96, perpendicular to the piston rods 92, 94, 96 and parallel to the frame members 14, 16. The transverse drive members 120, 122, 124 are suitably connected to the piston rods 92, 94, 96, such as by clamps. Each transverse drive member 120, 122, 124 carries connectors, some of which are designated 126 in FIG. 7, that are used to connect the floor slats to the transverse drive beams 120, 122, 124. See for example my aforementioned U.S. Pat. Nos. 4,474,285 and 4,793,469.

Referring to FIGS. 7 and 12, in some embodiments of the invention 9 switching value 32 and related other valves are mounted on the gusset 70. However, these components are constructed so that they can be rotated 180° and mounted on the gusset 72. The gussets 70, 72 are provided with mounting bolt openings and an access opening or slot 71, 73 for the plumbing (FIG. 3). In some installations, it is desirable to have the valve components on one side of the hydraulic drive assembly. In others it is desirable to have the valve components on the opposite side of the drive assembly. Preferably, a single frame F is constructed to receive more than one assembly of linear hydraulic motors. For example, one assembly of linear hydraulic motors may have cylinders measuring 2.5 inches in diameter. Another may have cylinders measuring 3 inches in diameter. Both embodiments would have the same size piston rods and the horizontal and vertical placement of the center lines of the piston rods would be the same. The manifolds would be constructed such that the pattern of mounting holes would be the same for both cylinder diameters. The cross-drives 120, 122, 124 are all identical and a single set of cross-drives can be used for both sizes of cylinders. As another variation, a slightly different frame could be used for cylinders measuring 3.5 and 4 inches in diameter. For these cylinder sizes, the same piston rods and the same cross-drives would be used.

With the drive unit construction that is illustrated, the total depth of the assembly is relatively small. For the embodiments with 2.5 and 3 inch cylinders, the height of the assembly is about 5½ inches.

In summary of the above, the drive unit of the invention has a universal frame and universal cross-drives with plural of combinations of linear hydraulic drive motor assemblies. This feature of the invention allows for efficient manufacturing and reduces the inventory of different parts necessary for the different size models.

The connectors 126 on the cross-drives 120, 122, 124 have one end near one boundary of their cross-members 120, 122, 124 and an opposite end portion that overhangs the adjacent cross-members 120, 122, 124. This construction makes it possible to keep the window in which the drive members 120, 122, 124 move relatively narrow.

In the illustrated embodiments, the control rod for the switching valve 32 extends through an opening in the vertical wall 68 of the frame member 14. The hole required is small enough that the strength and load carrying capability of the frame member 14 is not severally compromised. Placement of the switching valve 24 on the gusset portion (70 or 72) of the frame member 12, and the extension of the control rod through the opening in the vertical wall 68, contribute in a big way to the ability to keep the total height of the drive unit within 5½ inches, or thereabouts.

As best shown by FIGS. 12 and 13, the assembly of hydraulic linear motors includes tie bolts 112, 114, 116, 118 that interconnect the two manifolds 102, 104. Manifold 102 is connected by bolts 124 to the mounting pads 34, 36. Manifold 104 is connected to the mounting lugs 38, 40 by bolts 120. When the assembly 80, 82, 84, 102, 104 is secured in place, the assembly of hydraulic cylinders, and the bolts, becomes a structural part of the system. They take the part of the mounting frame structure that has been removed between the frame members 24, 26.

The illustrated embodiment shows hydraulic fluid conduits endwise outwardly of the manifold 104. These conduits may be replaced by passageways that are formed in manifold 104 and in the housing of the valve member which is endwise outwardly of the switching valve.

Figure 6:
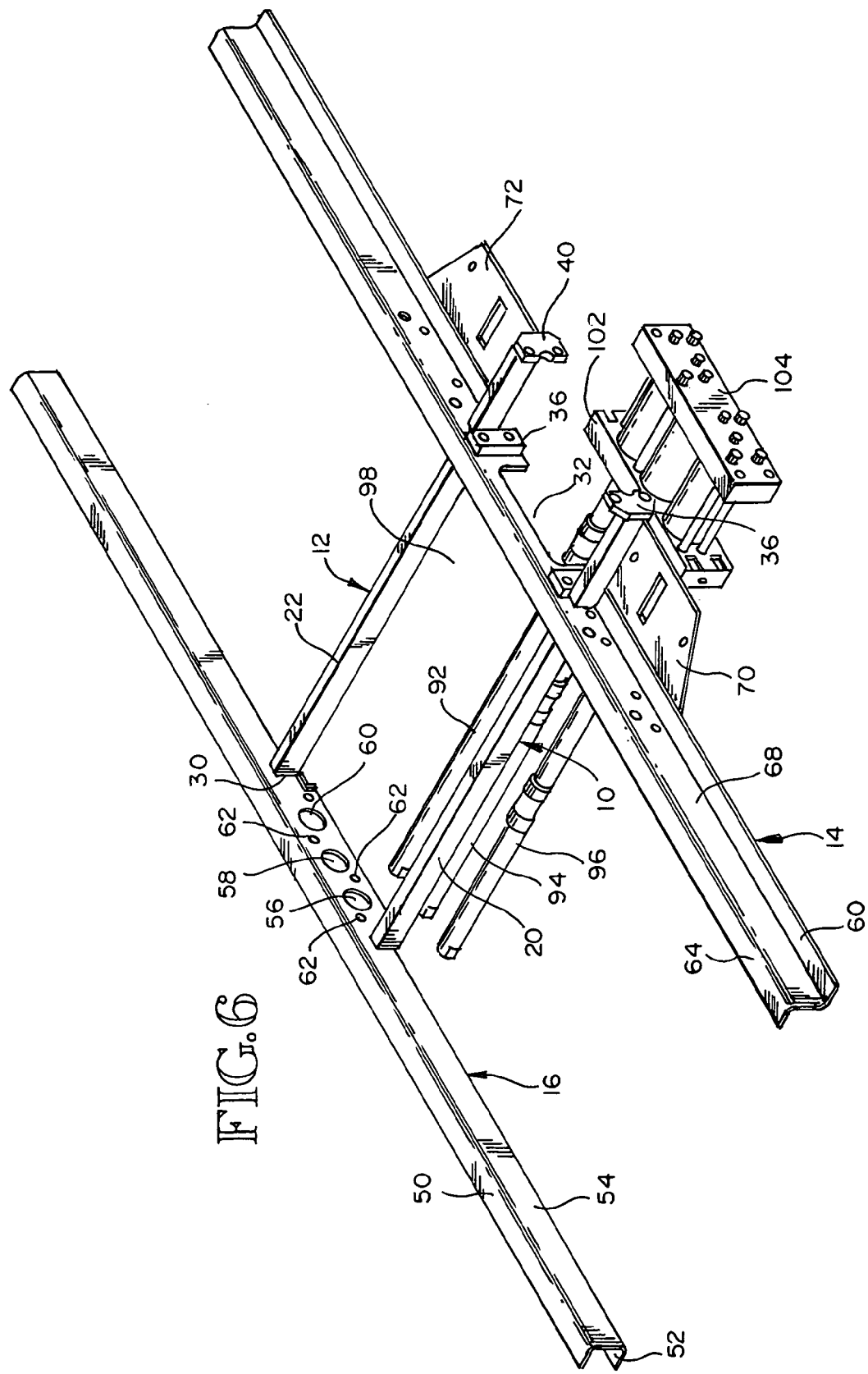
FIG. 6 is a view like FIG. 1, taken from the same aspect of FIG. 1, but including the assembly of linear hydraulic motors shown spaced below the mounting frame.
Figure 16:
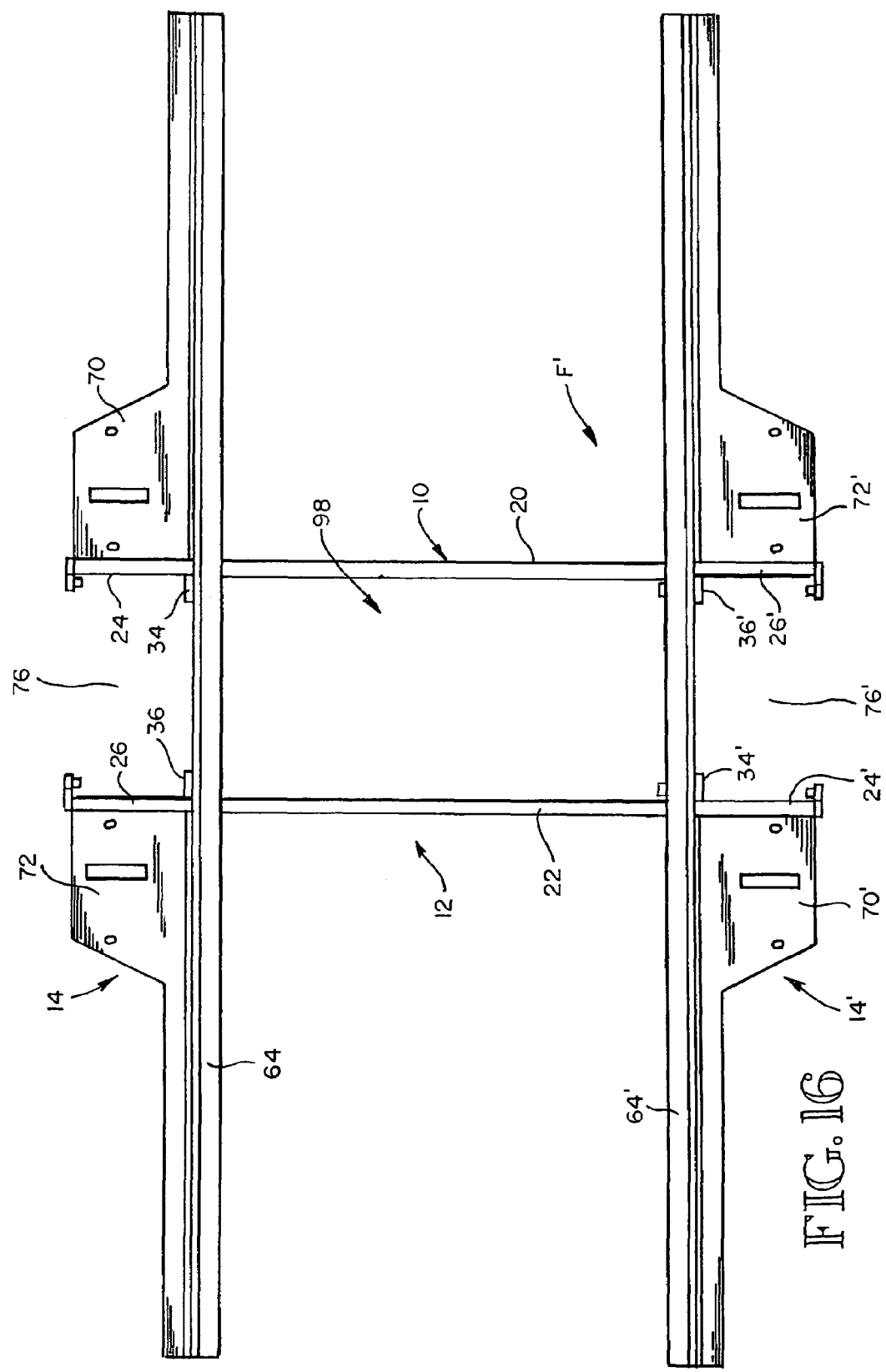
FIG. 16 is a view like FIG. 4 of a mounting frame for mounting a six cylinder assembly of linear hydraulic motors, such view being like FIG. 4 but showing the upper portion of FIG. 4 duplicated at the opposite end of the frame.

FIG. 16 shows a drive unit mounting frame F' constructed to mount an assembly of tandem linear hydraulic motors, each composed of a piston rod and a piston 99 and a cylinder component at each end of the rod. Example assemblies of this type are disclosed by my U.S. Pat. No. 6,026,949, granted Feb. 22, 2000. In column 2 of that patent there is reference to a type of tandem drive unit that is of a tie bolt construction, such as disclosed in FIGS. 6, 12 and 13 herein. In FIG. 16, the frame member 16 at the second end of the frame F' is replaced by a frame member 14'. Frame member 14' is identical to frame member 14 that has already been described. Because of the common construction of the drives, only the modified mounting frame F' has been illustrated. A second set of cylinders and manifolds at the second ends of the piston rods are as illustrated at the top of FIG. 7 with respect to embodiment shown by that figure. In this embodiment, the three transverse drive beams 120, 122, 124 are identical as in the earlier embodiments. Also, the frame F' may be used for mounting a plurality of sizes of cylinder diameters. The horizontal and vertical positioning of the center lines of the piston rods are the same in all sizes and the mounting holes are the same in size and placement in all embodiments.

The illustrated embodiments are only examples of the present invention and, therefore, are non-limitive. It is to be understood that many changes in the particular structure, materials and features of the invention may be made without departing from the spirit and scope of the invention. Therefore, it is my intention that my patent rights not be limited by the particular embodiments that are illustrated and described herein, but rather are to be determined by the following claims, interpreted according to accepted doctrines of claim interpretation, including use of the Doctrine of Equivalents.

What is claimed is:

1. A mounting frame for an assembly of linear hydraulic motors, each having a cylinder component and a piston component, said cylinder component having a closed first end and an opposite second end, said piston component including a piston rod projecting out from the second end of its cylinder component, and said mounting frame comprising:
   a pair of longitudinal frame members laterally outwardly bounding the linear hydraulic motors;
   a transverse frame member extending perpendicular to the longitudinal frame members and dividing them into major and minor parts;
   said transverse frame member being connected to the longitudinal frame members, with the minor parts of the longitudinal frame members extending in one direction from the transverse frame member and the major parts of the longitudinal frame members extend in the opposite direction from the transverse frame member;
   said transverse frame member having a vertical portion that includes a downwardly opening recess in its extent between the longitudinal frame members;
   said vertical portion of the transverse frame member having mounting pads for the second ends of said cylinder components at the ends of the recess, where the minor parts of the longitudinal frame members meet the transverse frame member;
   said minor parts of the longitudinal frame members having outer ends and mounting lugs at the outer ends for the outer ends of the cylinder components;
   wherein the mounting frame is adapted to receive the cylinder components of the plurality of linear hydraulic motors laterally between the minor parts of the longitudinal frame members and longitudinally between the mounting pads on the transverse frame member and the mounting lugs at the outer ends of the minor parts of the longitudinal frame members;
   wherein the mounting pads are adapted to be connected to the second ends of the cylinder components; and
   wherein the mounting lugs are adapted to be connected to the first ends of the cylinder components.

2. The mounting frame of claim 1, comprising horizontal gussets laterally outwardly of the minor parts of the longitudinal frame members, extending between the minor parts of the longitudinal frame members and the vertical portion of the transverse frame member.

3. The mounting frame of claim 2, wherein the vertical portion of the transverse frame member and the gussets are formed from a single sheet metal member.

4. The mounting frame of claim 2, wherein the gussets are connected to lower edge portions of the minor parts of the longitudinal frame members.

5. The mounting frame of claim 1, wherein the mounting pads and the mounting lugs include bolt receiving openings.

6. The mounting frame of claim 1, wherein the major parts of the longitudinal frame members have ends distal the transverse frame member, and a second transverse frame member extends perpendicular to the longitudinal frame members and is connected to the distal ends of the major parts of the longitudinal frame members, said second transverse frame member being adapted to receive and guide end portions of the piston rods.

7. The mounting frame of claim 1, wherein the transverse frame member has an upper portion connected to the vertical portion and extending horizontally from the vertical portion towards the side of the vertical portion on which the major parts of the longitudinal frame members are situated, and a lower portion connected to the vertical portion and extends from the vertical portion in the direction on which the minor parts of the longitudinal frame members are situated.

8. The mounting frame of claim 7, wherein the lower part of the transverse frame member includes gusset forming portions that extend between the vertical portion of the transverse frame member and the minor parts of the longitudinal frame members, laterally outwardly of the minor parts of the longitudinal frame members.

9. The mounting frame of claim 8, wherein the lower portion of the transverse frame member is narrow in its extent laterally outwardly of the gussets.

10. The mounting frame of claim 7, wherein the gussets are connected to lower edge portions of the minor parts of the longitudinal frame members.

11. The mounting frame of claim 7, wherein the mounting pads and the mounting lugs include bolt receiving openings.

12. The mounting frame of claim 7, wherein the major parts of the longitudinal frame members have ends distal the transverse frame member, and a second transverse frame member extends perpendicular to the longitudinal frame members and is connected to the distal ends of the major parts of the longitudinal frame members, said second transverse frame member being adapted to receive and guide end portions of the piston rods.

13. A drive unit for a reciprocating slat conveyor, comprising:
   an assembly of linear hydraulic motors, each having a cylinder component and a piston component, said cylinder component having a closed first end and an opposite second end, said piston component including a piston rod projecting out from the second end of its cylinder component; and a mounting frame comprising:

a pair of longitudinal frame members laterally outwardly bounding the linear hydraulic motors;

a transverse frame member extending perpendicular to the longitudinal frame members and dividing them into major and minor parts;

said transverse frame member being connected to the longitudinal frame members, with the minor parts of the longitudinal frame members extending in one direction from the transverse frame member and the major parts of the longitudinal frame members projecting in the opposite direction from the transverse frame member;

said transverse frame member having a vertical portion that includes a downwardly opening recess in its extent between the longitudinal frame members;

said vertical portion of the transverse frame member having mounting pads for the second ends of said cylinder components at the ends of the recess, where the minor parts of the longitudinal frame members meet the transverse frame member;

said minor parts of the longitudinal frame members having outer ends and mounting lugs at the outer ends for the outer ends of the cylinder components;

wherein the mounting frame is adapted to receive the cylinder components of the plurality of linear hydraulic motors laterally between the minor parts of the longitudinal frame members and longitudinally between the mounting pads on the transverse frame member and the mounting lugs at the outer ends of the minor parts of the longitudinal frame members;

wherein the mounting lugs are connected to the first ends of the cylinder components; and wherein the mounting pads are connected to the second ends of the cylinder components.

14. The drive unit mounting frame of claim 1, comprising horizontal gussets laterally outwardly of the minor parts of the longitudinal frame members, extending between the minor parts of the longitudinal frame members and the vertical portion of the transverse frame member.

15. The drive unit of claim 14, wherein the vertical portion of the transverse frame member and the gussets are formed from a single sheet member.

16. The drive unit of claim 14, wherein the gussets are connected to lower edge portions of the minor parts of the longitudinal frame members.

17. The drive unit of claim 13, wherein the mounting pads and the mounting lugs include bolt receiving openings, and bolts extend through said opening and connect to the assembly of linear hydraulic motors.

18. The drive unit of claim 1, wherein the major parts of the longitudinal frame members have ends distal the transverse frame member, and a second transverse frame member extends perpendicular to the longitudinal frame members and is connected to the distal ends of the major parts of the longitudinal frame members, said second transverse frame member receiving and guiding end portions of the piston rods.

19. The drive unit of claim 13, wherein the transverse frame member has an upper portion connected to the vertical portion and extending horizontally from the vertical portion towards the side of the vertical portion on which the major parts of the longitudinal frame members are situated, and a lower portion connected to the vertical portion and projecting from the vertical portion in the direction on which the minor parts of the longitudinal frame members are situated.

20. The drive unit of claim 19, wherein the lower part of the transverse frame member includes gusset forming portions that extend between the vertical portion of the transverse frame member and the minor parts of the longitudinal frame members, laterally outwardly of the minor parts of the longitudinal frame members.

21. The drive unit of claim 20, wherein the lower portion of the transverse frame member is narrow in its extent laterally outwardly of the gussets.

22. The drive unit of claim 19, wherein the gussets are connected to lower edge portions of the minor parts of the longitudinal frame members.

23. The drive unit of claim 19, wherein the mounting pads and the mounting lugs include bolt receiving openings and bolts extend through said opening and connect to the assembly of linear hydraulic motors.

24. The drive unit of claim 19, wherein the major parts of the longitudinal frame members have ends distal the transverse frame member, and a second transverse frame member extends perpendicular to the longitudinal frame members and is connected to the distal ends of the major parts of the longitudinal frame members, said second transverse frame member receiving and guiding end portions of the piston rods.

* * * * *